UNITED STATES PATENT OFFICE.

BERNHARD RICHARD, OF BASEL, SWITZERLAND, ASSIGNOR TO ANILINE COLOR & EXTRACT WORKS, FORMERLY JOHN R. GEIGY, OF BASEL, SWITZERLAND.

AZO DYE.

1,067,881. Specification of Letters Patent. Patented July 22, 1913.

No Drawing. Application filed November 7, 1912. Serial No. 730,042.

*To all whom it may concern:*

Be it known that I, BERNHARD RICHARD, subject of the German Emperor, and resident of Basel, in Switzerland, have invented certain new and useful Improvements in Azo Dyes, of which the following is a specification.

Many azo dyes containing phenol as a component are so sensitive to alkalis that their use as dyes is practically excluded. Such compounds have hitherto been alkylated in order to avoid this disadvantage.

I have found that this sensitiveness to alkalis may be prevented by substituting the hydrogen atom of the phenolic hydroxyl group by an arylsulfonyl residue.

I have found that the dyeing character of wool dyes is not altered by introducing an arylsulfonyl group, but their shade is changed, and they are no longer sensitive to alkali. If however, the starting materials have been direct coloring matters, such as derivatives of paradiamins, or other dyestuffs dyeing cotton without a mordant, then, as a rule, their affinity to cotton is considerably weakened. Such dyes are, on the other hand, very well suited for dyeing wool and silk, and are faster to washing and milling than the corresponding alkyl derivatives. In certain cases however, the dyeing character of a direct dyestuff is not altered, as for example in the case of arnica yellow (see Schulz and Julius "*Farbstofftabellen*", 4th edition, page 52 No. 144. Nitrosostilbenedisulfonicacid-azo-phenol.)

The introduction of the arylsulfonyl group is best accomplished by well stirring an aqueous suspension of the dye containing sodium carbonate or sodium hydroxid with an arylsulfonylchlorid until the coloring matter is no longer sensitive to caustic soda, sodium carbonate or ammonia. It is not necessary, as a rule, to isolate the coloring matters before they are treated with an arylsulfonylchlorid, but it is possible to perform this reaction after their preparation in the same liquid.

The following examples serve to illustrate my invention:—

1. The compound obtained by coupling 18.4 kg. of benzidin, after tetrazotizing it, with 30.3 kg. of naphthylamindisulfonic acid (2.3.6) and 9.3 kg. of phenol is mixed with water and 30 kg. of sodium carbonate. At a temperature of 30°–35° centigrade, 24 kg. of phenylsulfonychlorid corresponding to the formula:—

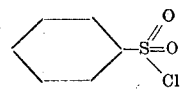

are gradually added. The dye, which was partly dissolved, becomes more yellow, and finally separates as a brilliant red precipitate which is isolated in the well known manner. This new azo dye dyes wool and silk an orange shade which is relatively fast to alkali, washing and milling. The dye thus produced has most probably the following formula:

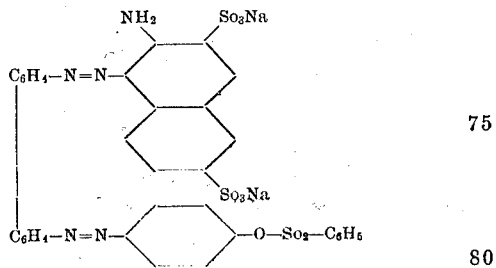

2. The dye obtained by condensing para-amidophenol and para-nitrotoluene-sulfonic acid with sodium hydroxid is dissolved in hot water and rendered weakly alkaline with sodium hydroxid. At 70°–75° centigrade, paratolylsulfonylchlorid is slowly added and the liquid is well stirred. The alkaline reaction must be maintained throughout the process. As soon as the dye is no longer sensitive toward alkali the liquid is filtered. This compound dyes cotton a yellow shade which is relatively fast to acids and alkalis. The dye thus produced has most probably the following formula:—

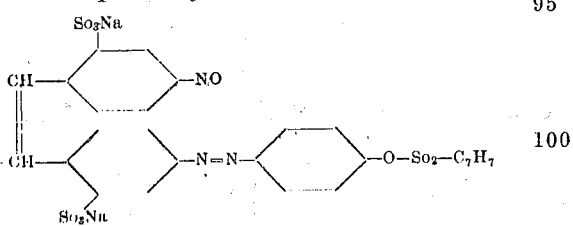

I do not limit myself to the particular quantities of ingredients or to the stated alkalis or temperatures of reaction mentioned herein, all of which may be varied without going beyond the scope of my invention.

A few additional azo dyes obtained in a similar manner are shown in following table:

| Azo dye used as starting material. | Arylsulfonylchlorid having been employed. | Shade on wool and silk. |
|---|---|---|
| p-Amido-diphenylaminsulfonic-acid-azo-phenol | p-Tolylsulfonylchlorid | Greenish-yellow. |
| Benzidin ⟨Amino R acid / Phenol⟩ | Chlorphenylsulfonylchlorid | Orange. |
| Benzidin-mono-sulfonic-acid ⟨Sulfophenylmethylpyrazolone / Phenol⟩ | Paratolylsulfonylchlorid | Reddish-yellow. |
| m-Tolidin ⟨Sulfophenylmethylpyrazolone / Phenol⟩ | p-Tolylsulfonylchlorid | Greenish-yellow. |
| Benzidin ⟨Naphtholdisulfonic-acid G / Phenol⟩ | β-naphthylsulfonylchlorid | Yellow-red. |
| Do | Nitrophenylsulfonylchlorid | Do. |
| Benzidin ⟨Naphtholdisulfonic-acid 1.3.6 / Phenol⟩ | p-Tolylsulfonylchlorid | Bluish-red. |
| m-Tolidin ⟨Naphtholdisulfonic-acid 1.3.6 / Phenol⟩ | p-Tolylsulfonylchlorid | Yellowish-red. |
| Diamidostilbenedisulfonic-acid ⟨Phenol / Phenol⟩ | p-Tolylsulfonylchlorid | Yellow. |
| Benzidin ⟨Amino R acid / o-Cresol⟩ | p-Tolylsulfonylchlorid | Orange. |
| Benzidin ⟨Naphtholdisulfonic-acid G / m-Cresol⟩ | p-Tolylsulfonylchlorid | Yellowish-red. |
| Benzidin ⟨Amino R acid / p-Cresol⟩ | p-Tolylsulfonylchlorid | Orange. |
| Sulfanilic-acid-azo-m-oxydiphenylamin | p-Tolylsulfonylchlorid | Yellowish-brown. |
| p-Phenylenediamine ⟨Phenol / Aminonaphtholdisulfonic-acid H⟩ | p-Tolylsulfonylchlorid | Blue-violet. |
| p-Phenylenediaminphenol combined in acid solution with aminonaphthol-disulfonic-acid H and recombined in alkaline solution with diazotized analin. | p-Tolylsulfonylchlorid | Blue-black. |
| p-Aminophenol-sulfophenylmethylpyrazolone | p-Tolylsulfonylchlorid | Yellow. |

Having thus described my invention, what is claimed, is:—

1. The process of producing azo dyes which consists in treating an azo dye containing a phenolic hydroxyl group with an arylsulfonylchlorid substantially as described.

2. The process of producing azo dyes which consists in treating an azo dye containing a phenolic hydroxyl group with an arylsulfonylchlorid in the presence of an alkali, substantially as described.

3. As a new article of manufacture, the azo dye produced by treating an azo dye containing a phenolic hydroxyl group with an arylsulfonylchlorid in the presence of alkali, which dye-stuff dyes animal or vegetable fibers yellow to blue black shades relatively fast to alkali, and which is in the form of a yellow to black powder, giving aminoarylesters of arylsulfonic acids with other compounds upon reduction with stannous chlorid and hydrochloric acid.

Signed at Basel in Switzerland this 23d day of October A. D. 1912.

BERNHARD RICHARD.

Witnesses:
   GEO. GIFFORD,
   ARNOLD ZUBER.